(12) United States Patent
Slusar et al.

(10) Patent No.: US 9,356,923 B2
(45) Date of Patent: *May 31, 2016

(54) VERIFICATION THAT A USER ATTEMPTING TO ACCESS CONTENT IS A HUMAN USER

(71) Applicant: HERE GLOBAL B.V., Veldhoven (NL)

(72) Inventors: Mark Slusar, Chicago, IL (US); Ken Prchal, Seattle, WA (US)

(73) Assignee: HERE Global B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,630

(22) Filed: Mar. 13, 2015

(65) Prior Publication Data

US 2015/0195269 A1    Jul. 9, 2015

Related U.S. Application Data

(63) Continuation of application No. 13/483,655, filed on May 30, 2012, now Pat. No. 9,003,554.

(51) Int. Cl.
　　*G06F 21/00*　　(2013.01)
　　*H04L 29/06*　　(2006.01)
　　*H04W 4/02*　　(2009.01)
　　*H04W 12/06*　　(2009.01)

(52) U.S. Cl.
　　CPC .............. *H04L 63/08* (2013.01); *H04L 63/308* (2013.01); *H04W 4/02* (2013.01); *H04W 12/06* (2013.01)

(58) Field of Classification Search
　　None
　　See application file for complete search history.

(56) References Cited

U.S. PATENT DOCUMENTS

| | | | |
|---|---|---|---|
| 6,430,407 B1 | 8/2002 | Turtiainen | |
| 7,552,467 B2 | 6/2009 | Lindsay | |
| 7,565,330 B2 | 7/2009 | Steeves et al. | |
| 7,760,137 B2 * | 7/2010 | Martucci et al. | 342/357.39 |
| 7,945,470 B1 * | 5/2011 | Cohen | G06Q 10/06311 455/433 |
| 8,112,100 B2 * | 2/2012 | Frank | G06Q 10/1095 455/414.2 |
| 8,112,483 B1 * | 2/2012 | Emigh | G06F 21/36 709/206 |
| 8,181,262 B2 | 5/2012 | Cooper et al. | |
| 8,307,412 B2 | 11/2012 | Ozzie et al. | |
| 8,365,260 B2 * | 1/2013 | Gabriel | G06F 21/36 713/182 |

(Continued)

FOREIGN PATENT DOCUMENTS

WO　　WO2010008722 A1　　1/2010

OTHER PUBLICATIONS

Tomaszewski, Brian; MacEachren, Alan M. Geo-Historical Context Support for Information Foraging and Sensemaking: Conceptual Model, Implementation, and Assessment. 2010 IEEE Symposium on Visual Analytics Science and Technology (VAST). Relevant pp. 139-146.　　http://ieeexplore.ieee.org/stamp/stamp.jsp?tp=&arnumber=5652895.*

(Continued)

*Primary Examiner* — Jeremiah Avery
(74) *Attorney, Agent, or Firm* — Lempia Summerfield Katz LLC

(57) ABSTRACT

An easier and less frustrating way of verifying that a user attempting to access content is a human user is provided. For example, data indicative of a request by a user to access content from a content server is received. An output of geographic data associated with a geographic region is generated. A task to be performed by the user to access the content is provided as a function of the generated output. The output and the task are transmitted to the content server for presentation to the user. Performance of the task by the user is substantially indicative of the user being a human user.

20 Claims, 7 Drawing Sheets

(56) References Cited

U.S. PATENT DOCUMENTS

| | | | |
|---|---|---|---|
| 8,387,122 B2 * | 2/2013 | Toomim | G06F 21/6218 713/183 |
| 8,489,112 B2 * | 7/2013 | Roeding | G06Q 30/00 455/412.1 |
| 8,494,854 B2 * | 7/2013 | Gross | G10L 17/26 370/259 |
| 8,566,602 B2 | 10/2013 | Aaron | |
| 8,590,026 B2 * | 11/2013 | Kumar et al. | 726/7 |
| 8,621,209 B1 | 12/2013 | Johansson et al. | |
| 2003/0069029 A1 * | 4/2003 | Dowling | H04L 12/1859 455/456.1 |
| 2009/0210937 A1 | 8/2009 | Kraft et al. | |
| 2011/0035284 A1 * | 2/2011 | Moshfeghi | 705/14.58 |
| 2011/0225629 A1 | 9/2011 | Pai | |
| 2012/0192252 A1 | 7/2012 | Kuo et al. | |
| 2012/0198570 A1 * | 8/2012 | Joa | G06F 21/30 726/30 |
| 2013/0036458 A1 * | 2/2013 | Liberman | H04L 9/3231 726/6 |
| 2013/0072233 A1 * | 3/2013 | Sandholm | 455/456.3 |

OTHER PUBLICATIONS

Shyu, Chi-Ren; Klaric, Matt; Scott, Grant J.; Barb, Adrian S.; Davis, Curt H.; Palaniappan, Kannappan. GeoIRIS: Geospatial Information Retrieval and Indexing System. IEEE Transactions on Geoscience and Remote Sensing. vol. 45, Issue: 4. Pub. Date: 2007. http://ieeexplore.ieee.org/stamp/stamp.jsp?tp=&arnumber=4137867.*

Petcher, Adam; Khazan, Roger; Utin, Dan. A Usable Interface for Location-Based Access Control and Over-the-Air Keying in Tactical Environments. Military Communications Conference, 2011. Pub. Date: 2011. Relevant pp. 1480-1486. http://ieeexplore.ieee.org/stamp/stamp.jsp?tp=$arnumber=6127515.

* cited by examiner

150

VERIFICATION THAT A USER ATTEMPTING TO ACCESS CONTENT IS A HUMAN USER

BACKGROUND

This application is a continuation under 37 C.F.R. §1.53(b) and 35 U.S.C. §120 of U.S. patent application Ser. No. 13/483,655 filed May 30, 2012, which is incorporated herein by reference.

BACKGROUND

CAPTCHA, which stands for a "Completely Automated Public Turing test to tell Computers and Humans Apart," is, as it name suggests, a way of determining whether a content user is a human or a computer (i.e. automated user). CAPTCHA typically involves having a computer create a test that will be difficult for a computer or automated user to solve but easy for a human user to solve. The user is prompted to answer or solve the test, which may then be graded by the computer. Accordingly, if the user solves the test, the computer presumes that the answer was entered by a human and, thus, that the user is a human. A common type of a known CAPTCHA requires the user to identify letters, numbers, or a combination thereof provided in a distorted image on the computer screen.

CAPTCHA may be used to prevent automated computer programs (e.g., robots) from performing actions, such as accessing or otherwise manipulating the user interfaces of websites, sending out e-mail spam using webmail services (e.g., Gmail, Hotmail, Yahoo!), or posting on blogs or forums, that may harm or otherwise degrade the service, quality, or speed of a given service. At the same time, known CAPTCHA methods may unintentionally prevent human users from performing those same actions when, for example, the CAPTCHA test is difficult for the human user to solve. This may occur when the distorted image is difficult to read or the distorted image includes a word that is unfamiliar to human users. For these reasons, known CAPTCHA tests may frustrate and annoy human users.

BRIEF DESCRIPTION OF THE DRAWINGS

Exemplary embodiments of the present invention are described herein with reference to the following drawings.

DETAILED DESCRIPTION OF THE DRAWINGS AND PRESENTLY PREFERRED EMBODIMENTS

The disclosed embodiments relate to a method and system for verifying that a user attempting to access content is a human user. Unlike known CAPTCHA methods and systems, which may be difficult for human users to solve or perform and thus may frustrate and annoy those users, the disclosed embodiments aim to provide a method and system that still effectively distinguishes human users from automated or computer programs, but does so in a way that is easier, less frustrating, and less annoying for human users. Beneficially, the disclosed embodiments may also serve to help assess and verify the quantity and certainty of outputs of geographic data, such as maps and models, for a geographic region.

Figure 1:
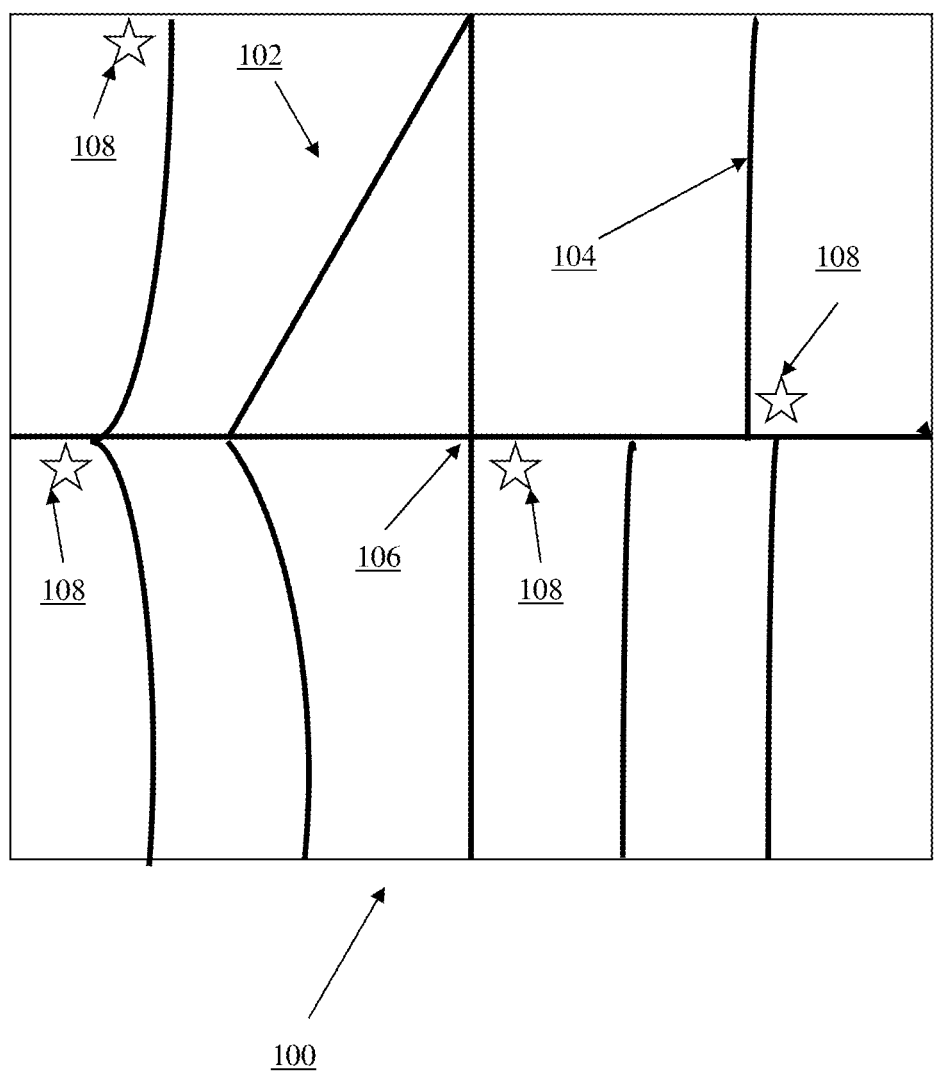
FIG. 1 depicts a map of an exemplary geographic region.

FIG. 1 is diagram illustrating an exemplary geographic region 100. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may also represent locations without reference to geo-political boundaries, such as being a rectangular region centered on or relative to a particular point or location. The region 100 includes a road network 102. The road network 102 may include, among other things, a plurality of road segments 104 connected at intersections 106 throughout the region 100. The region 100 may also include one or more points of interest 108, such as buildings (e.g., skyscrapers), businesses, municipal entities (e.g. City Hall), tourist attractions, and/or other points of interest not explicitly described herein. The region 100 further includes a public transit network that includes, for example, railroads, public bus lines, tourist bus lines, metro railway lines (e.g., subways and elevated lines), light rail (e.g., trams, trolleys, or street cars), water taxi, and stations and/or stops for one or more of each.

Additional, different, or fewer items may be included in the region 100. For example, the road network 102, the road segments 104, the intersections 106, the points of interest 108, and/or the public transit network is/are not provided. Though not depicted herein, the region 100 may also include a pedestrian network having sidewalks and pedestrian paths, a bicycle network having bike paths, bike lanes on road segments, and/or road segments appropriate for bicycle travel. The region 100 may include other networks, features, and/or points as well.

Figure 2:
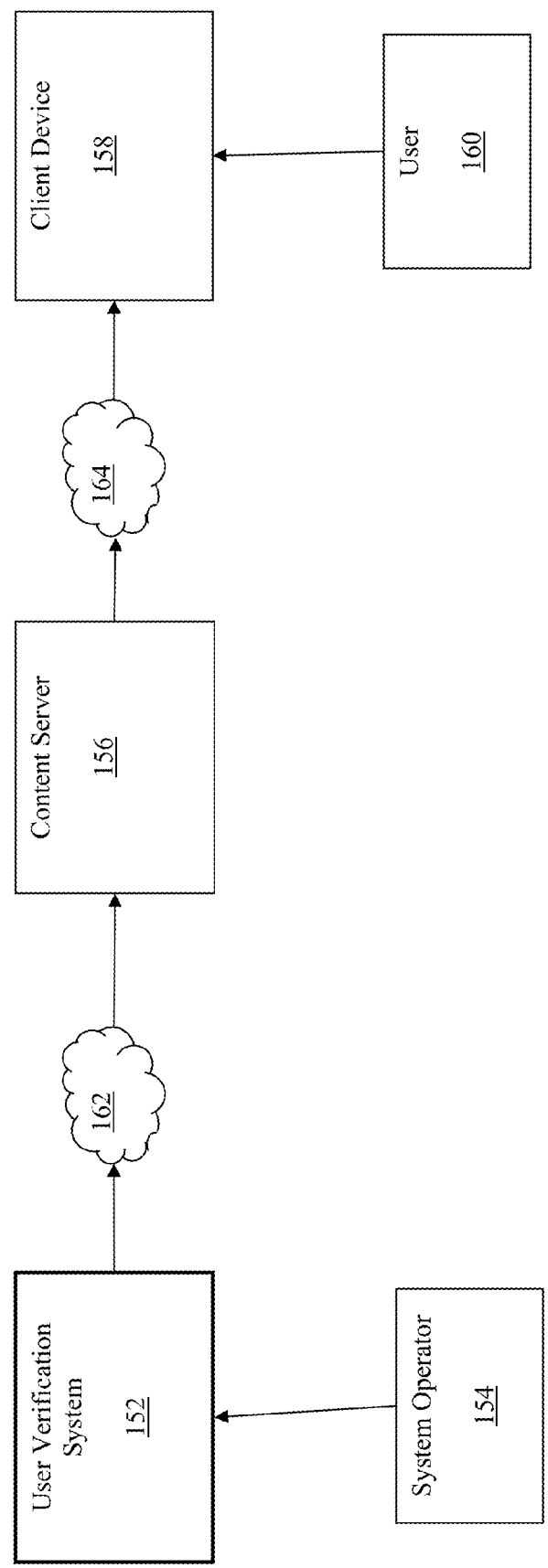
FIG. 2 depicts a block diagram of one embodiment of a system for verifying that a user attempting to access content is a human user.

FIG. 2 shows a block diagram of one embodiment of a system 150 for determining whether a user attempting to access content is a human user or is an automated user (e.g., computer). The system 150 generally includes a user verification system 152 operated by, or otherwise associated with, a system operator 154 (e.g., NAVTEQ or Nokia Corp.), a content server 156, and a client device 158 associated with (e.g. owned or operated by) a human or automated (e.g., computer, bot, robot, etc.) user 160. In this embodiment, the user verification system 152 is coupled with or connected to the content server 156 via a wired or wireless communication network 162, and the content server 156 is coupled with or connected to the client device 158 via a wired or wireless communication network 164. As used herein, the phrases "in communication" and "couple" are defined to mean directly connected to or indirectly connected through one or more intermediate components. Such intermediate components may include hardware and/or software based components. Additional, different, or fewer components may be provided. For example, additional content servers 156 and/or networks 162 and/or client devices 158 and/or networks 164 may be provided. In other embodiments, the user verification system 152, and components thereof, may be partially or fully located within or be part of the content server 156. For example, the content server 156 may contain the user verification system 152. In other embodiments, the user verification system 152 (or individual components thereof, as described below) may be implemented as computer program logic or computer readable program code stored in the memory and/or storage of a computer, such as the computer 500 described below with respect to FIG. 7, and executable by one or more processors thereof to implement the disclosed functionality.

The content server 156 may include one or more computers and/or may be part of a larger network of servers. The content server 156 may, for example, maintain a database from which content may be generated (i.e. the content server 156 is a "website") or maintain an index of content from which content may be produced in response to specific search queries (i.e. the content server 156 is a search engine). The content may be, for example, a webpage, such as a message board, blog, or forum, or an email account.

The networks 162, 164 may be wireless networks or combinations of a wired and wireless network, such as a 802.11x compliant network, and may include publicly accessible networks, such as the Internet, private networks, or combination thereof. The type and configuration of the communications networks 162, 164 are implementation dependent, and any type of communications network which facilitates the described communications between the user verification system 152 and the content server 156 and/or the content server 156 and the client device 158, available now or later developed, may be used.

Figure 3:
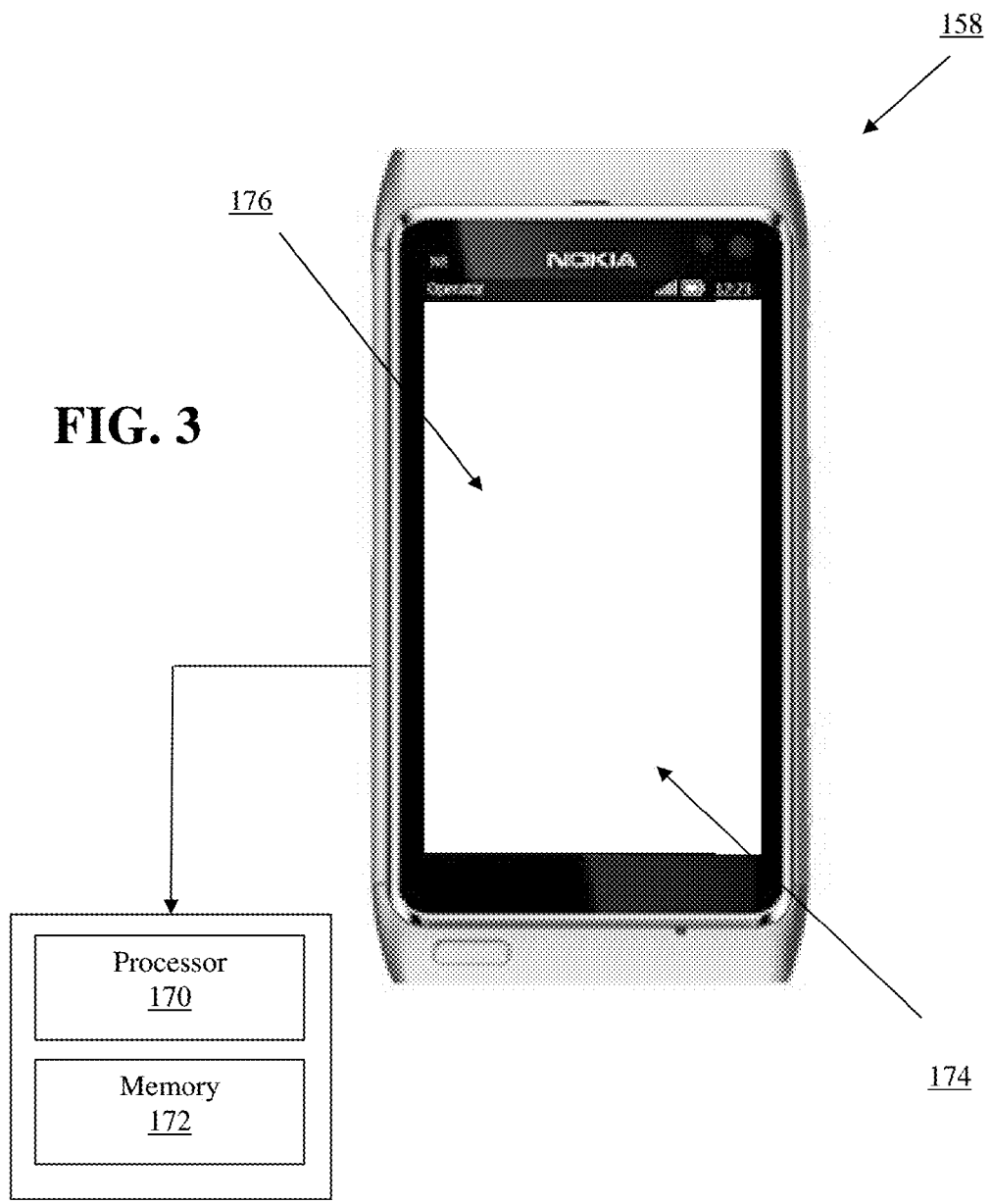
FIG. 3 depicts a block diagram of one embodiment of a client device of the system of FIG. 2.

FIG. 3 shows the client device 158 in greater detail. In this embodiment, the client device 158 is a mobile device, such as a smart phone, a mobile phone, a personal digital assistant ("PDA"), a tablet computer, a notebook computer, a personal navigation device ("PND"), a portable navigation device, and/or any other known or later developed portable or mobile device, associated with the user 160. In other embodiments, the client device 158 may be a desktop computer, workstation, or any other known or later developed non-portable or non-mobile client device associated with the user 160.

In this embodiment, the client device 158 includes a processor 170, a memory 172, an input device 174, and a display 176. The processor 170 may be any type of processor suitable for mobile devices and/or computers. The memory 172 may be a volatile memory or a non-volatile memory. The memory 172 may include one or more of a read only memory (ROM), random access memory (RAM), a flash memory, an electronic erasable program read only memory (EEPROM), or other type of memory. The memory 172 may include an optical, magnetic (hard drive) or any other form of data storage device. The memory 172 may be removable from the client device 158 (e.g., may be a secure digital (SD) memory card).

The input device 174 may be one or more buttons, keypad, keyboard, mouse, stylist pen, trackball, rocker switch, touch pad, voice recognition circuit, touch screen, or other device or component for inputting data to the client device 158. The user 160 may, for example, request or access content from the content server 156 via or using the input device 174. The display 176 may be a liquid crystal display (LCD) panel, light emitting diode (LED) screen, thin film transistor screen, or another type of display. The display 176 is operable to display or present one or more outputs and one or more tasks from the system 152 and, if the user 160 is determined to be a human user, the display 176 is operable to display or present content obtained or received from the content server 156. As shown in FIG. 3, in this embodiment, the client device 158 has a touch screen, which may be capacitive, resistive, surface acoustic wave, or another type, such that the input device 174 and the display 176 are the same.

The client device 158 further includes one or more detectors or sensors located or positioned anywhere within, on, outside of, or a combination thereof, the client device 158. The one or more detectors or sensors are generally operable to detect, recognize, or measure the environment around the device 158, the relationship between the device 158 and the environment (i.e., the relationship of the device to the environment), and/or changes thereto. In one embodiment, the one or more detectors or sensors may be operable to detect, recognize, or measure translational and/or rotational movement, or a rate of change therein, of the client device 158, which may be movement or acceleration due to changing an orientation of the client device 158 and/or due to or caused by a change in the location or position of the device 158, e.g. by traveling along the road segments 104, the transit network, the bike network, other network, and/or other path or route in the geographic region 100. The one or more detectors or sensors may include an optical sensor or detector, such as a camera, a motion sensor or detector, such as a tilt sensor, gyroscope, or an accelerometer, a touch or tactile sensor, such as an infrared, acoustic, or capacitive sensor, any other known or later developed sensor or detector, or a combination thereof.

In one embodiment, the one or more detectors or sensors include a positioning system built or embedded into or within the interior of the client device 158. The positioning system includes a global positioning system (e.g., GPS) or a cellular or similar position sensor for providing location data. The positioning system may utilize GPS-type technology, a dead reckoning-type system, cellular location, or combinations of these or other systems. The positioning system may include suitable sensing devices that measure the traveling distance, speed, direction, and so on, of the device 158. The positioning system may also include a receiver and correlation chip to obtain a GPS signal. Alternatively or additionally, the one or more detectors or sensors may include an accelerometer built or embedded into or within the interior of the client device 158. The accelerometer is operable to detect, recognize, or measure the rate of change of translational and/or rotational movement of the client device 158 by the user 160.

Software in the form of a Web browser (e.g. Firefox, Internet Explorer) or a plug in or proprietary application built into an operating system of the device 158 may provide an interface between the user 160 of the client device 158 and the network 164 (e.g. the Internet). The user 160 may, using the input device 174 and/or the display 176 of the device 158, request or attempt to access content, via the interface, from or via the content server 156. In some cases, such as when granting the request or attempt to access content will not harm or otherwise degrade the service, quality, or speed of the service provided by the content server 156, the content server 156 may automatically provide or display the requested content to the user 160 via the display 176 of the client device 158. When, however, granting the request to access content or allowing access to the content may harm the service, quality, or speed of the service provided by the content server 156, the content server 156 may first verify that the user 160 is a human user, and not an automated computer program (e.g., robot), before the requested content is provided to the user 160. Accordingly, the content server 156 may utilize the user verification system 152 to determine whether the user 160 is a human user or an automated computer program.

Figure 4:
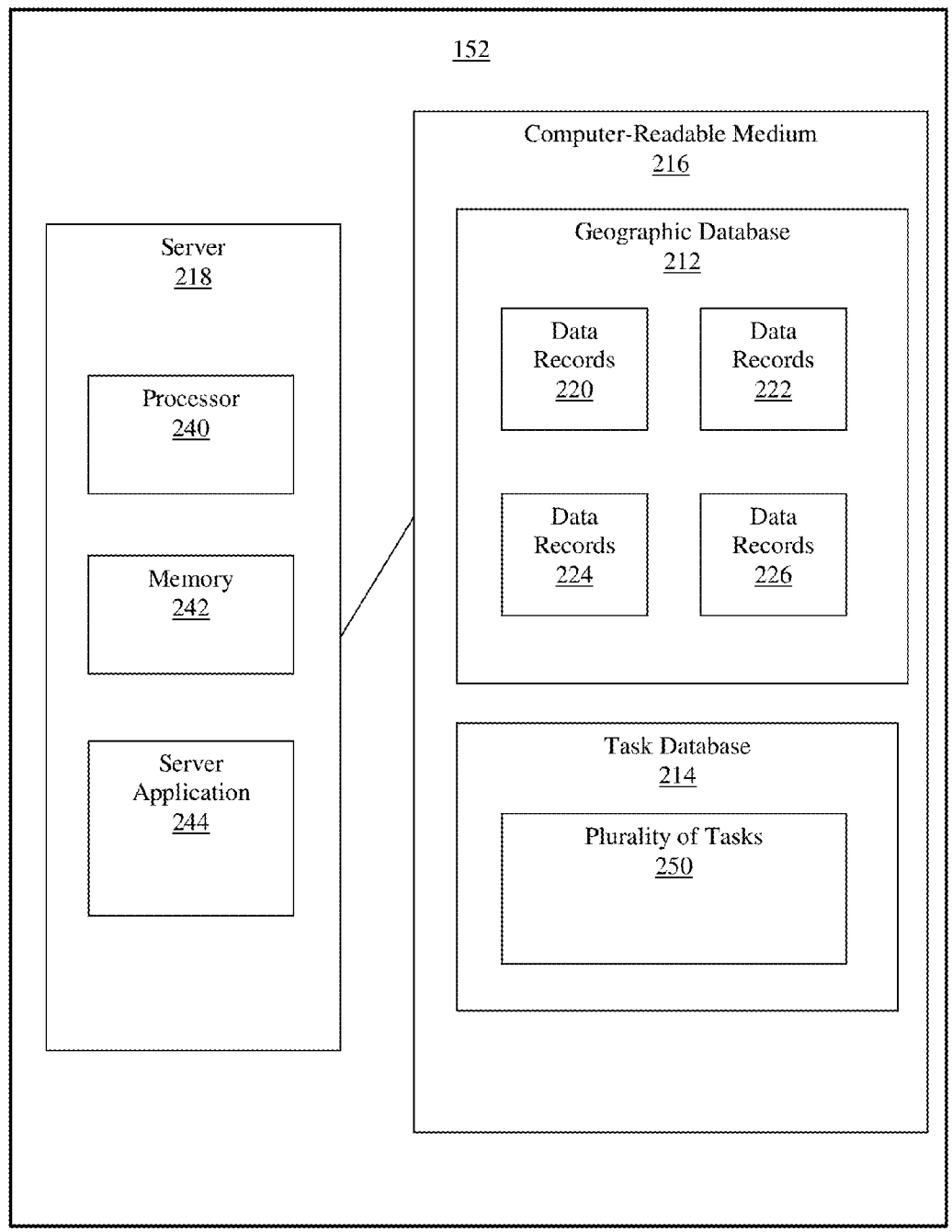
FIG. 4 depicts a block diagram of one embodiment of a user verification system of the system of FIG. 2.

FIG. 4 shows a block diagram of the user verification system 152 in greater detail. The system 152 includes a geographic database 212 and a task database 214 stored on a computer readable medium 216. The computer readable medium 216 may include one or more non-transitory media, such as hard drives, solid state memory or other storage media. The system 152 further includes a server 218 that may access the computer readable medium 216 and, more particularly, the geographic database 212 and/or the task database 214 stored thereon. In other embodiments, the server 218 may be part of or separate (e.g., remote) from the geographic database 212 and/or the task database 214. In other embodiments, the geographic database 212 and/or the task database 214 may also be stored on different computer readable mediums. As mentioned above, in other embodiments, the system 152 or components of the system 152 (e.g., the geographic database 212, the task database 214, and/or the server 218, or portions thereof) may be part of the content server 156.

The geographic database 212 stores or maintains geographic data, such as, for example, road segment or link data records 220, node data records 222, point of interest data records 224 and public transit data records 226. The link data records 220 are links or segments representing the roads, streets, or paths 104. The node data records 218 are end points (e.g., the intersections 106) corresponding to the respective links or segments of the road segment data records 220. The road data link records 220 and the node data records 222 may represent, for example, the road network 102 or other road networks used by vehicles, cars, and/or other entities. The road link data records 220 may be associated with attributes of or about the roads 104, such as geographic coordinates (e.g., local coordinates and/or global coordinates, such as latitude, longitude, or altitude), street names, address ranges, speed limits, turn restrictions at intersections, and other navigation related attributes (e.g., one or more of the road segments 104 is part of a highway or toll way, the location of stop signs and/or stoplights along the road segments 104, etc.), as well as POIs, such as gasoline stations, hotels, restaurants, museums, stadiums, offices, automobile dealerships, auto repair shops, buildings, stores, parks, etc.

The node data records 222 may likewise be associated with attributes (e.g., about the intersections 106), such as geographic coordinates, street and/or intersection names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The point of interest data records 224 may be associated with attributes of or about one or more of the points of interest 108, such as name (e.g., the official name or a local nickname), geographic coordinates, address, phone number, hours of operation, size (in absolute terms or relative to other points of interest 108, color (of the POI as a whole or portions thereof), shape (of the POI as a whole or portions thereof) and/or a classification (e.g., restaurant, hotel, coffee shop, museum, etc.) of or for the point of interest 108. The public transit data records 226 may be associated with attributes of or about the public transit network, such as name (e.g. the official name or a local nickname), geographic coordinates, location (e.g., above ground, below ground), of or about railroads, public bus lines, tourist bus lines, metro railway lines (e.g., subways and elevated lines), light rail lines (e.g., trams, trolleys, or street cars), water taxis, and stations and/or stops for one or more of each in the public transit network. The public transit data records 226 may also be associated with one or more road segments 104, intersections 106, and/or POIs 108. The geographic data may also include other data records, such as, for example, cartographic data records, routing data, and maneuver data. Additional, fewer, or different data records may be provided.

The server 218 includes a processor 240, a memory 242, and a server application 244. The server application 244 may be stored on one or more hard drive(s), cache, RAM, or other computer-readable media operated by the server 218 and loaded into the memory 242 of the server 218 to be executed by the processor 240. In other embodiments, additional, different, or fewer components may be used for the server 218.

The server application 244 is generally operable to provide different outputs of the geographic data to the content server 156. The server application 244 may, for example, generate different outputs of the geographic data for the geographic region 100, such as digital map images, a raster or pixel based map images (e.g. JPEG, Bitmap, Pixmap, Tiff, etc.), and/or vector-based digital graphical map images or models of the geographic data (e.g. in a scalable vector graphics ("SVG") format, portable document format ("PDF"), post script ("PS") format, other vector graphics format, and/or other graphical model format). In one embodiment, the server application 244 may generate different outputs of the geographic data by retrieving or obtaining, from the geographic database 212, one or more outputs of the geographic data for the geographic region 100 stored or maintained therein. In another embodiment, the server application 244 may generate different outputs of the geographic data by accessing or obtaining the geographic data, particularly the data records 220, 222, 224, and/or 226, stored or maintained in the geographic database 212, and generating or creating one or more outputs of the geographic data for the geographic region 100 using or based on the obtained or accessed geographic data. The map images or models of the geographic data may be two-dimensional or three-dimensional map images or models. The server application 244 may generate map images or models of the geographic data from any number of views (e.g., birds-eye, perspective, side, etc.) of the geographic region 100.

In another embodiment, the server application 244 may, using, for example, the positioning device of the client device 158, determine the geographic location or position of the client device 158 and generate the one or more outputs of the geographic data based on or as a function of the determined geographic location of the client device 158. In the event that the client device 158 is not a portable device (the device 158 is, for example, a desktop computer), the server application 244 may determine the geographic location or position of the client device 158 using or based on the IP address of the device 158 or any other geo-localization technique. In turn, the server application 244 may generate (i.e., create or obtain) the one or more outputs of the geographic data based on or as a function of the determined geographic location of the client device 158. The server application 244 may be written in a suitable computer programming language such as C, although other programming languages, such as C++ or Java, are also suitable.

The task database 214 stores or maintains a plurality of tasks 250 designed or configured such that the successful performance or completion thereof is substantially indicative that a human user has performed or completed the task rather than an automated computer program (e.g., a robot). Each task 250 is a specification (e.g., instructions or directions), explicit and/or implicit, of one or more actions to be taken with respect to the one or more outputs of the geographic data. Accordingly, each task 250 is generally associated with one or more road segment or link data records 220, node data records 222, point of interest data records 224, public transit data records 226, or combinations thereof stored or maintained in the geographic database 212. The one or more actions to be taken with respect to the one or more outputs may be real-world actions (e.g., walk towards a specific building in real-life, as indicated by or on the one or more outputs displayed or presented on the display 176 of the client device 158), actions to be directly performed on the one or more outputs displayed or presented on the display 176 of the device 158 (e.g., draw a circle around a specific building on the one or more outputs of geographic data displayed or presented on the display 176), or combinations thereof.

Each task 250 is a substantially machine-incomprehensible specification (i.e., the content server 156 and/or the client device 158 and/or any other computer cannot comprehend or understand the task 250, or, in other words, what is meant by the specification). The tasks 250 may not be effectively or efficiently performed, or performed at all, by the content server 156 and/or the client device 158 and/or any other computer. The tasks 250 generally include machine-incomprehensible directions or instructions to manipulate one or more input sensors of the client device 158, such as the input device 174, the display 176, the positioning device, the accelerometer, or combinations thereof.

In one embodiment, the tasks 250 may include machine-incomprehensible directions or instructions to identify, distinguish, compare, relate or indicate one or more specific geographic features, such as a road segment 104, an intersection 106, a POI 108, a railroad/rail/railway, bus, or taxi stop or station in the public transit network, on or in one or more outputs (e.g., maps, models) of geographic data for the geographic region 100 displayed or provided on or via the display 176 of the device 158. The machine-incomprehensible directions or instructions may, for example, include directions or instructions to provide (e.g., draw, insert, or otherwise create) a geometric shape (e.g., circle, square, triangle, a smiley face), a letter (e.g., X), a number (e.g. 1), or combinations thereof, on, around, at, near, or at the center of one or more specific geographic features on or in the one or more outputs of geographic data displayed or provided on or via the display 176 of the device 158. The machine-incomprehensible directions or instructions may include directions or instructions to provide (e.g., draw, insert, or otherwise create) a line or arrow to or from a specific geographic feature or between two or more specific geographic features (i.e. connecting two or more specific geographic features with the line or arrow) on or in the one or more outputs of geographic data displayed or provided on or via the display 176 of the device 158.

Alternatively or additionally, the tasks 250 may include machine-incomprehensible directions or instructions to answer one or more questions about one or more specific geographic features on or in the one or more outputs (e.g. maps, models) of the geographic data displayed or provided via or on the display 176, or, more generally, about the one or more outputs (e.g. maps, models) of the geographic data displayed or provided via or on the display 176. The questions may concern attributes of geographic features on or in the one or more outputs of geographic data. Exemplary questions include: "what is the name of this street?" "what is the name of this building?" "what color is this building?" and "what is the shape of the top of this building?" Reference may be made to the one or more outputs of geographic data and/or the geographic features in the real-world (i.e., external to the client device 158) to answer any of these questions. If, for example, the question is "what color is this building?" the user may answer this question by identifying the color of the building directly from the one or more outputs (e.g., the one or more outputs may indicate that the color of the building is red) and/or by identifying the color of the building in the real-world (e.g., the one or more outputs do not show the color of the building and, instead, the user may have to find the building in the real-world and determine the color of the building by viewing the building in the real-world). The questions may, alternatively or additionally, concern the geographic features in or on the one or more outputs of geographic information or basic details or attributes about the one or more outputs of geographic information. Exemplary questions include: "what is the tallest building on or in this map?" "how many train stops do you see on or in this map?" "is this map or model a view from above or below?" and "which building is closer in this map or model?" Reference may be made to the one or more outputs of geographic data and/or the geographic features in the real-world to answer any of these questions. Any number of other questions may also be used.

Alternatively or additionally, the tasks 250 may include machine-incomprehensible directions or instructions to manipulate the accelerometer or positioning device of the device 158, by performing a specific real-world action, such as, for example, walking towards, away from, or crossing one or more specific real-world geographic features indicated in the one or more outputs of geographic data displayed or provided via or on the display 176. The directions or instructions may, for example, include directions (provided, for example, audibly, in written form on the display 176, and/or directly on the one or more outputs of geographic data), to achieve or perform the specific real-world action. In other embodiments, the accelerometer, positioning device, and/or other sensors or detectors of the client device 158 may be manipulated in any other number of ways.

When the user 160 requests or attempts to access content via or from the content server 156 and the content server 156 wishes to verify that the user 160 is a human user, and not an automated computer program (e.g., robot) before the content server 156 provides the requested content to the user 160, the content server 156 may utilize the user verification system 152 to verify that the user 160 is a human user. The content server 156 is operable to send or transmit, to the system 152, particularly the server application 244, data indicative of a request or attempt, by the user 160, to access content made from the content server 156. When the server application 244 receives the data indicative of the request by the user 160 to access content from the content server 156, the server application 244 is operable to generate (e.g., create, obtain, retrieve, or provide) one or more outputs of geographic data associated with the geographic region 100. As noted above, the server application 244 may obtain or retrieve the one or more outputs of geographic data from the geographic database 212 or may access the geographic data stored in the geographic database 212 and may, in turn, create or provide one or more maps or one or more models of the geographic data associated with the geographic region 100.

Figure 5:
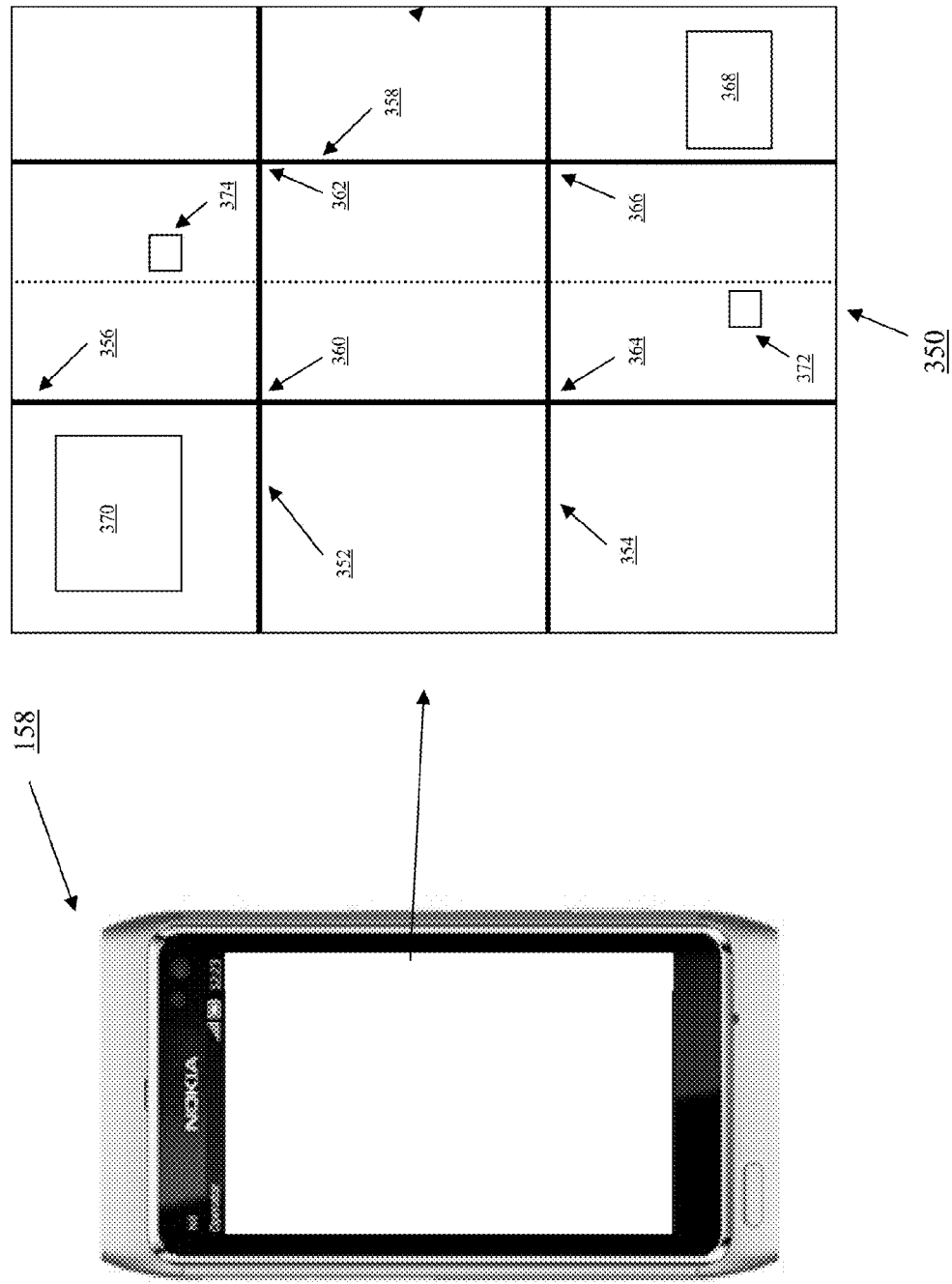
FIG. 5 depicts the client device of FIG. 3 displaying one embodiment of an output of geographic data associated with the geographic region of FIG. 1.

In this embodiment, the server application 244 generates map 350 (see FIG. 5) of the geographic data associated with the geographic region 100. As shown in FIG. 5, the map 350 depicts geographic data associated with a portion of the geographic region 100. Specifically, the map 350 is a birds-eye two-dimensional view of the portion of the geographic region 100 and includes road segments 352, 354, 356, 358 of the plurality of road segments 104, intersections 360, 362, 364, 366, POIs 368, 370 of the plurality of POIs 108, and train or rail stops 372, 374 in the transit network. Road segment 352 travels in an East-West direction and is named "Washington Street." Road segment 354 also travels in an East-West direction and is named "Jefferson Avenue." Road segment 356 travels in a North-South direction and is named "Lincoln Boulevard." Road segment 358 also travels in a North-South direction and is named "Roosevelt Street." Road segments 352 and 356 intersect at intersection 360, road segments 352 and 358 intersect at intersection 362, road segments 354 and 356 intersect at intersection 364, and road segments 354 and 358 intersect at intersection 366. POI 368 is the Post Office for this portion of the geographic region 100 and is known as "the James Madison Memorial Post Office." POI 370 is a ninety (90) story skyscraper that is known as the "Nokia building." Train stops 372, 374 are train stops along or on the same train line and are located between the road segments 356, 358 as shown.

In other embodiments, the server application 244 may generate one or more different maps of the geographic data associated with the same portion of the geographic region 100. The one or more different maps may be a different view (e.g., perspective, side, etc.) and/or a three-dimensional view of the same portion of the geographic region 100. In other embodiments, the server application 244 may generate one or more maps of the geographic data associated with different portions of the geographic region 100, such that the maps include different road segments of the plurality of road segments 104, different intersections, different POIs of the plurality of POIs 108, and/or other train or rail stops and/or train or rail stations and/or bus stops or bus stations in the transit network. In one embodiment, the server application 244 may generate first and second maps. The first map may include geographic data associated with a first portion of the geographic region 100, while the second map may include geographic data associated with a second portion of the geographic region 100. The first and second portions of the geographic region 100 may depict some of the same areas or portions of the region 100, but may also depict some different areas or portions of the region 100. In other embodiments, the server application 244 may generate one or more models of the geographic data associated with the same or different portions of the geographic region 100. In one embodiment, the server application 244 generates a model of the geographic data associated with the same portion of the geographic region 100 depicted in the map 350 described above.

In turn, the server application 244 is operable to provide (e.g., obtain, retrieve, create, or generate), as a function of the generated one or more outputs of the geographic data, a task 250 for the user 160 to perform with respect to the geographic data to access the content requested by the user. When the server application 244 generates one or more maps of geographic data, the task is provided as a function of the one or more maps. Accordingly, the task 250 is associated with the generated one or more maps. When the server application 244 generates one or more models of geographic data, the task 250 is provided as a function of the one or more models. Accordingly, the task 250 is associated with the generated one or more maps. In some embodiments, the server application 244 may provide as a function of the generated one or more outputs of the geographic data, additional tasks 250 for the user to perform. These additional tasks 250 may need to be performed or completed for the user 160 to access the content or, in some cases, may have no bearing on the user's ability to access the content. Instead, the additional tasks 250 may be used by the system operator 154 to gather or collect geographic data about the geographic region 100, which may, in turn, be used to update the one or more outputs and/or verify the quality and/or certainty of the one or more outputs of the geographic data for the geographic region 100.

Performance of the task 250 by the user 160 substantially indicates that the user 160 is a human user rather than an automated computer program (e.g., bot). In other words, the task 250 is designed or configured to statistically distinguish between a human user and an automated user. In some embodiments, the server application 244 retrieves a general task (e.g., "how tall is a building?") from the task database 214 and creates, provides, or generates a task specific to the generated one or more outputs (e.g. maps and/or models). In other embodiments, the server application 244 may retrieve or obtain a specific task, pre-associated with the generated one or more outputs, from the task database 214.

In this embodiment, the server application 244 provides a task specific to the map 350 for the user 160 to perform. The task may include, as noted above, machine-incomprehensible directions or instructions to manipulate one or more input sensors (e.g., the input device 174, the display 176, the accelerometer, and/or the positioning device). The task may include machine-incomprehensible instructions or directions to identify, compare, relate, or indicate one or more specific geographic features, such as the road segments 352, 354, 356, 358, the intersections 360, 362, 364, 366, POIs 368, 370, and/or train or rail stops 372, 374, on or in the map 350. In one embodiment, the task may include machine-incomprehensible instructions or directions to provide, draw, insert, or create a geometric shape, a letter, a number, or combinations thereof, on, around, at, near, or at the center of one or more of these specific geographic features on or in the map 350. In another embodiment, the task may include machine-incomprehensible instructions or directions to provide, draw, insert, or create a line or arrow to or from one of these specific geographic features or between two or more of these specific geographic features on or in the map 350. For example, the task may be to "draw a line or an arrow between "Washington Street" and "Jefferson Avenue," "draw a circle around the James Madison Memorial Post Office," "place an X on the Nokia building," or "create an arrow to the intersection between Washington Street and Roosevelt Street." The task may be to identify or indicate other geographic features on or in the map 350 as well.

The task may include machine-incomprehensible instructions or directions to answer one or more questions about one or more specific geographic features depicted by the map 350 or about the map 350 itself. The questions may concern attributes of the geographic features depicted by the map 350. Exemplary questions include: "what is the name of this building (provided with an arrow pointing to the POI 370)?" "what color is the Nokia building?" or "what is the shape of the top of the James Madison Memorial Post Office?" The questions may also concern basic details or attributes about the map 350. Exemplary questions include: "what is the tallest building on this map (the map 350)?" "how many train stops do you see in this map (the map 350)?" or "how many intersections do you see in this map (the map 350)?" Reference may be made to the map 350 and/or the geographic features in the real-world to answer any of these questions. Other questions may be used as well.

The server application 244 is operable to provide or transmit the generated (e.g., obtained, retrieved, provided, or created) one or more outputs and the provided (e.g., retrieved, obtained, created, or generated) task to the client device 158 for presentation to the user 160. In some embodiments, the server application 244 may be operable to provide or transmit the generated one or more outputs and the provided task to the content server 156, which may then transmit or provide the one or more outputs and the task to the client device 158. In other embodiments, the server application 244 may be operable to directly provide or transmit (i.e., without using the content server 156 as an intermediary) the one or more outputs and the task to the client device 158.

In this embodiment, the server application 244 is operable to provide the generated map 350 and the provided task to the content server 156 for presentation to the user 160 via the client device 158. In other embodiments, the server application 244 may provide or transmit one or more other maps and/or one or more models and a different or similar task to the content server 156 for presentation to the user 160 via the client device 158. The content server 156 may, in turn, present, provide, or display the generated one or more outputs and the provided task on the display 176 of the client device 158 associated with the user 160. In this embodiment, the server application 244 presents, provides, or displays the generated map 350 and the provided task on the display 176 of the client device 158. In other embodiments, the server application 244 may provide, present, or display one or more other maps and/or one or more models and a different or similar task on the display 176 of the client device 158. In this embodiment, the map 350 and the provided task may, for example, be displayed in the interface (e.g. the Web browser or the application) between the user 160 of the client device 158 and the network 164 and displayed or provided on the display 176 of the client device 158. In other embodiments, the map 350 and the provided task may be presented or provided to the user 160 in a different way, such as via e-mail or short-message service (SMS).

Once the content server 156 presents, provides, or displays the one or more outputs (e.g., the map 350) and the provided task, the content server 156 may provide or allot the user 160 a pre-determined or specified amount of time (e.g., 1 minute) to perform the created task. The content server 156 may, alternatively, provide or allot the user 160 an unlimited amount of time to perform the provided task.

The system 150, particularly the content server 156, the client device 158, the server application 244, or combinations thereof, is then operable to detect or determine a manipulation of the one or more input sensors of the client device 158 (e.g., the input device 174, the display 176, the positioning device, and/or the accelerometer) by the user 160 in response to or based on the displayed, presented, or provided one or more outputs of geographic data (e.g., the map 350) and the task. Depending on the provided task, the manipulation may be (1) a geometric shape, a letter, a number, or combinations thereof, drawn, inserted, or created, by the user 160 using or via the input device 174 and/or the display 176, on, around, at near, or at the center of one or more specific geographic features on or in the one or more outputs of the geographic data (e.g., the map 350); (2) a line or arrow drawn, inserted, or created, by the user 160 using or via the input device 174 and/or the display 176, to or from a specific geographic feature or between two or more specific geographic features on or in the one or more outputs of the geographic data (e.g., the map 350); (3) a written answer or response, typed or entered by the user 160 using or via the input device 174 and/or the display 176, or an oral answer or response, entered, spoken, or recorded by the user 160 using or via the input device 174; (4) movement of the client device 158 by the user 160 (i.e., manipulation of the positioning device and/or the accelerometer of the client device 158 by the user 160); or (5) combinations thereof.

The system 150, via the content server 156, the client device 158, the server application 244, or combinations thereof, may determine whether the task has been performed by the user 160 based on this manipulation. In some embodiments, the content server 156 is operable to determine whether the task has been performed by the user 160 based on the manipulation. The content server 156 may receive, from the client device 158, data indicative of a performance of the task by the user 160 (i.e., data indicative of the manipulation or response to the task), and may receive, from the server application 244, a model or correct performance of the task (i.e., a model or correct manipulation or response to the task) by or from the user 160. The model or correct manipulation or response to the task may be received simultaneously with the task or may be received after the task has already been received (e.g., after the manipulation of the one or more input sensors). The content server 156 may compare the data indicative of the performance of the task by the user received from the client device 158 and the model or correct performance of the task received from the server application 244.

In other embodiments, the server application 244 is operable to determine whether the task has been performed based on the manipulation. In these embodiments, the server application 244 receives, from the client device 158 (e.g., via the content server 156), data indicative of a performance of the task by the user 160 (i.e., data indicative of the manipulation or response to the task by the user 160). Once the server application 244 receives this data, the server application 244 may compare the manipulation or response to the task by the user 160 with the model or correct manipulation or response to the task. The model or correct manipulation or response to the task may be, for example, stored or maintained in the task database 214.

In further embodiments, the client device 158 is operable to determine whether the task has been performed by the user 160 based on the manipulation. In these embodiments, the processor 170 of the client device 158 may receive, from the one or more input sensors, data indicative of the manipulation of response to the task by the user 160. The processor 170 may also receive, from the content server 156 and/or the server application 244, a model or correct performance of the task (i.e., a model or correct manipulation or response to the task) by or from the user 160. In turn, the processor 170 may compare the manipulation or response to the task by the user 160 with the model or correct manipulation or response to the task.

The system 150 may determine that the task has been performed by the user 160 when the manipulation or response by the user 160 equals or satisfies the model or correct manipulation or response to the task. In some embodiments, the system 150 may determine that the task has been performed by the user 160 when the manipulation or response by the user 160 substantially equals or satisfies the model or correct manipulation or response to the task. This may be determined using a minimum requirement or threshold, such as, for example, a number (e.g., 1) of standard deviations from or within the model or correct manipulation or response to the task and/or a percentage of the model or correct manipulation or response to the task. As an example, with reference to the map 350 shown in FIG. 5, the system 150 may determine that the task of "drawing a circle around the James Madison Memorial Post Office," has been performed by the user 160 when the manipulation (i.e., the circle drawn using or via the input device 174 and/or the display 176) by the user 160 is within one standard deviation of the area within the model or correct circle around the James Madison Memorial Post Office. In other embodiments, the system 150 may determine that the task has been performed by the user 160 only when the manipulation or response by the user 160 exactly equals or satisfies the model or correct manipulation or response to the task. As an example, again with reference to the map 350, the system 150 may determine that the task of answering the question "how many train stops do you see in the map 350?" has been performed by the user 160 only when the manipulation (i.e., the written answer typed or entered using or via the input device 174 and/or the display 176) by the user 160 produces the model or correct manipulation or response of "two" or "2."

As noted above, performance of the task by the user 160 is substantially indicative of the user 160 being a human user rather than an automated computer program. Accordingly, when the system 150 determines that the task has been performed by the user 160, the system 150 has determined or verified that the user 160 is a human user. In the embodiments in which the server application 244 determines whether the task has been performed by the user 160, and the server application 244 subsequently determines or verifies that the user 160 is a human user, the server application 244 may generate and transmit, to the content server 156, data indicative of the user 160 being a human user. In turn, the content server 156 may provide or display the requested content to the user 160 via the display 176 of the client device 158. In the embodiments in which the content server 156 determines whether the task has been performed by the user 160, and the content server 156 subsequently determines or verifies that the user 160 is a human user, the content server 156 may, in turn, provide or display the requested content to the user 160 via the display 176 of the client device 158. In the embodiments in which the client device 158 determines whether the task has been performed by the user 160, and the client device 158 subsequently determines or verifies that the user 160 is a human user, the client device 158 may generate and transmit, to the content server 156, data indicative of the user 160 being a human user. In turn, the content server 156 may provide or display the requested content to the user 160 via the display 176 of the client device 158.

When, however, the system 150 determines that the task has not been performed (i.e., the manipulation or response by the user 160 does not exactly or substantially equal or satisfy the model or correct manipulation or response to the task), the system 150 may determine or conclude that the user 160 is an automated user. In some embodiments, the content server 156 may thus refuse to provide the user 160 with the requested content. In some situations, the system 150 may be correct that the user 160 is indeed an automated computer program. In other situations, though, the user 160 might actually be a human user who did not properly perform the task for some reason (e.g., the human user did not actually know the answer to the question, the manipulation or response by the user 160 did not satisfy or equal at least the threshold of the model or correct manipulation or response to the task, etc.). Accordingly, to prevent the content server 156 from undesirably refusing to provide a human user 160 with the requested content, in some embodiments, the server application 244 may generate (e.g., create, retrieve, obtain, or provide) a second output or second outputs of geographic data associated with the geographic region 100. The second output(s) is (are) may be different than or the same as the one or more outputs (e.g., the map 350) described above. Additionally or alternatively, the server application 244 may provide (e.g., create, retrieve, or obtain) as a function of the first or second output(s), a second task from the plurality of tasks 250 for the user 160 to perform. The second task may be different than the task described above. The server application 244 may provide the generated second output(s) or the generated second output(s) and the second provided task to the content server 156 for presentation to the user 160 via or using the client device 158. The system 150 (via the content server 156, the client device 158, the server application 244, or combinations thereof) may, in the same manner described above, determine whether the user 160 has performed the second task.

When the system 150 determines that the second task has been performed by the user 160, the system 150 has determined or verified that the user 160 is a human user. In the embodiments in which the server application 244 determines whether the task has been performed by the user 160, and the server application 244 subsequently determines or verifies that the user 160 is a human user, the server application 244 may generate and transmit, to the content server 156, data indicative of the user 160 being a human user. In turn, the content server 156 may provide or display the requested content to the user 160 via the display 176 of the client device 158. In the embodiments in which the client device 158 determines whether the task has been performed by the user 160, and the client device 158 subsequently determines or verifies that the user 160 is a human user, the client device 158 may generate and transmit, to the content server 156, data indicative of the user 160 being a human user. In turn, the content server 156 may provide or display the requested content to the user 160 via the display 176 of the client device 158.

When, however, the system 150 determines that the second task has not been performed, the system 150 may again determine or conclude that the user 160 is an automated user. The content server 156 may thus refuse to provide the user 160 with the requested content. Or, the above-noted process may be repeated again until the system 150 has determined that the user 160 is a human user or until the system 150 has determined that the user 160 is an automated computer program a specified number of times (e.g., 1, 2, 5, etc.), at which time the automated computer program may be blocked (e.g., permanently or temporarily) from accessing the content from the content server 156.

The system 150 described herein thus effectively distinguishes human users from automated computer programs (e.g., bots) and thus helps the content server 156 verify that a user requesting or attempting to access content is a human user rather than an automated computer program. At the same time, unlike known CAPTCHA tests, which typically require human users to read or interpret distorted and difficult to read combinations of letters and numbers (that often do not form a word or form a word that is unfamiliar to human users), the user verification system 152 provides a simple task for the human user to perform with respect to an easily understood output of geographic information. Beneficially, the system 150 may also be used to help validate the certainty of the one or more outputs (e.g., maps and/or models) used to help determine whether the user is a human user or an automated user. When, for example, the map 350 is used a significant number of times and the manipulation of the one or more input sensors of the client device 158 in response to a created task repeatedly yields the same answer, an operator of the geographic database 212 may be certain that the one or more outputs (e.g., the map 350) have been validated a significant number of times and are thus quality and accurate outputs of geographic data. When, however, the manipulation of the one or more input sensors of the client device 158 in response to a provided task consistently or repeatedly yields different answers or responses (especially the same different answers or responses), an operator of the geographic database 212 may realize that the one or more outputs of geographic data (e.g., the map 350) needs to be updated. The one or more outputs (e.g., the map 350) may be updated to include the geographic data represented by these different answers or responses, or may be updated in any other known manner.

Figure 6:
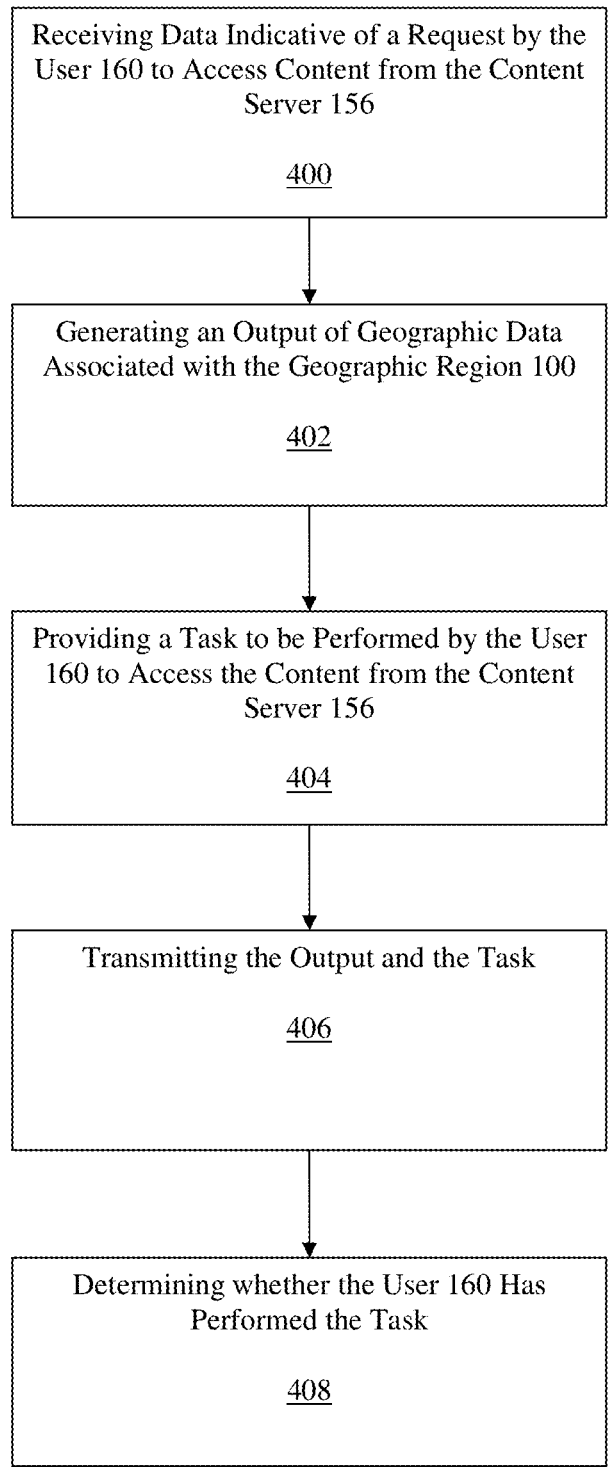
FIG. 6 depicts a flow chart showing one embodiment of a method for verifying that a user attempting to access content is a human user.

Referring to FIG. 6, there is shown a flow chart depicting the operation of the system 150 for determining whether a user is a human user or an automated computer program according to one embodiment. In one embodiment, the system 150 includes the user verification system 152, implemented as a computer having a processor and a memory coupled thereto. The method is implemented in the order shown, but may be implemented in or according to any number of different orders. Additional, different, or fewer acts may be provided. For example, the act of generating one or more outputs (act 402), the act of providing a task to be performed by the user 160 (act 404), the act of transmitting the output and the task for presentation to the user 160 (act 406), the act of determining whether the user 160 has performed the task, or combinations thereof, may be repeated any number of times.

The operation or method includes receiving data indicative of a request by a user 160 to access content from the content server 156 (act 400). In one embodiment, the data indicative of the request by the user 160 to access content is received directly from the content server 156. The user 160 may attempt to access content from the content server 156 via or using the client device 158, which is associated with the user 160 and may be connected with or coupled to the content server 156 via the wireless network 164.

The operation or method includes generating an output of geographic data associated with the geographic region 100 (act 402). The act of generating the output of geographic data may be performed in response to or as a function of the act of receiving the data indicative of a request (act 400). In one embodiment, the server application 244 generates the output of geographic data by retrieving or obtaining, from the geographic database 212, one or more outputs of the geographic data for the geographic region 100 stored or maintained therein. In another embodiment, the server application 244 generates the output of geographic data by accessing or obtaining the geographic data, particularly the data records 220, 222, 224, and/or 226, stored or maintained in the geographic database 212, and generating or creating one or more outputs of the geographic data for the geographic region 100 using or based on the obtained or accessed geographic data. More specifically, the output may be a digital map image, a raster or pixel based map image, and/or a vector-based digital graphical map image or model of the geographic data associated with the geographic region 100. The output may be a two-dimensional map or model or a three-dimensional map or model. The map or model may be from any number of views of the geographic region 100. In one embodiment, the server application 244 generates the map 350. In some embodiments, the server application 244 may generate more than one output of the geographic data (i.e., more than one map and/or model).

In some embodiments, the server application 244 retrieves a general task (e.g., "how tall is a building?") from the task database 214 and creates, provides, or generates a task specific to the generated one or more outputs (e.g. maps and/or models). In other embodiments, the server application 244 may retrieve or obtain a specific task, pre-associated with the generated one or more outputs, from the task database 214.

The operation or method includes providing a task to be performed by the user 160 to access the content from the content server 156 (act 404). Providing the task to be performed by the user 160 may include retrieving or obtaining a general task from the task database 214 and creating or generating a task specific to the output of geographic data. Alternatively, providing the task to be performed by the user 160 may include retrieving or obtaining a specific task, pre-associated with the generated output, from the task database 214. The plurality of tasks 250 includes a plurality of machine-incomprehensible instructions or directions to manipulate one or more input sensors on or of the client device 158. The one or more input sensors of the client device 158 may include, for example, the input device 174, such as the display 176, the positioning device, and/or the accelerometer. In one embodiment, the machine-incomprehensible instructions or directions may include instructions or directions to identify, compare, relate, or indicate one or more specific geographic features on the output of the geographic data. This includes, for example, directions or instructions to provide or create a geometric shape, a letter, a number, or combinations thereof, on, around, at, near, or at the center of the one or more specific geographic features. As an alternative or additional example, this includes directions or instructions to provide or create a line or arrow to or from a specific geographic feature or between two or more specific geographic features on the output of the geographic data. In another embodiment, the machine incomprehensible instructions or directions may include directions or instructions to answer one or more questions about the output of the geographic data or the one or more specific geographic features in the output of the geographic data. In yet another embodiment, the machine incomprehensible instructions or directions may include directions or instructions to manipulate the accelerometer, positioning device, any other input sensor, or combinations thereof, of the client device 158. The user 160 may manipulate the accelerometer and/positioning device of the client device 158 by, for example, perform a real-world action such as changing the location or orientation of the client device 158.

The operation or method includes transmitting the output and the task for presentation to the user 160 (act 406). In some embodiments, the server 218, particularly the server application 244, may provide or transmit the output and the task to the content server 156. In turn, the content server 156 may present, provide, or display the output and the task on the display 176 of the client device 158. In one embodiment, the content server 156 may present, provide, or display the output and the task in the interface between the user 160 and the network 164. In other embodiments, the server 218 may directly transmit the output and the task to the client device 158 for presentation to the user 160 via the display 176.

The operation or method includes determining whether the user 160 has performed the task (act 408). The system 150 (the content server 156, the client device 158, the server application 244, or combinations thereof), is operable to detect or determine a manipulation of the one or more input sensors of the client device by the user 160 in response to or based on the displayed, presented, or provided one or more outputs of the geographic data and the created task. The system 150 may determine whether the task has been performed by the user 160 based on this manipulation. The system 150 may determine that the task has been performed by the user 160 when the manipulation or response by the user 160 equals or satisfies a model or correct manipulation or response to the task. In other embodiments, the system 150 may determine that the task has been performed by the user 160 when the manipulation or response by the user 160 substantially equals or satisfies the model or correct manipulation or response to the task.

The performance of the task by the user is substantially indicative of the user being a human user. In some embodiments, the content server 156 determines whether the task has been performed by the user 160. In other embodiments, the server application 244 determines whether the task has been performed by the user 160. In further embodiments, the client device 158 determines whether the task has been performed by the user 160. Accordingly, when the content server 156, the client device 158, or the server application 244 has determined that the task has been performed by the user 160, the content server 156, the client device 158, or the server application 244 has, respectively, determined or verified that the user 160 is a human user. In the embodiments in which the server application 244 determines whether the task has been performed by the user 160, and the server application 244 subsequently determines or verifies that the user 160 is a human user, the server application 244 may generate and transmit, to the content server 156, data indicative of the user 160 being a human user. In turn, the content server 156 may provide or display the requested content to the user 160 via the display 176 of the client device 158. In the embodiments in which the content server 156 determines whether the task has been performed by the user 160, and the content server 156 subsequently determines or verifies that the user 160 is a human user, the content server 156 may, in turn, provide or display the requested content to the user 160 via the display 176 of the client device 158.

In one embodiment, generating the output of geographic data includes determining the geographic location of the client device 158 associated with the user and generating the output of the geographic data as a function of the determined geographic location. The geographic location of the client device 158 may be determined using, for example, the positioning device of the client device 158. In other embodiments, the geographic location of the client device 158 may be determined using or based on the IP address or some other way of geo-localizing the position or location of the client device 158.

In one embodiment, the operation or method further includes, when the user 160 does not perform the task, generating the second output of the geographic data associated with the geographic region 100. The second output is different than the first output. In another embodiment, the operation or method further includes providing, as a function of the generated second output, a second task to be performed by the user to access the content. The second task is different than the task. In another embodiment, the operation or method further includes transmitting the second output and the second task to the content server for presentation to the user. Performance of the second task by the user is substantially indicative of the user being a human user.

Figure 7:
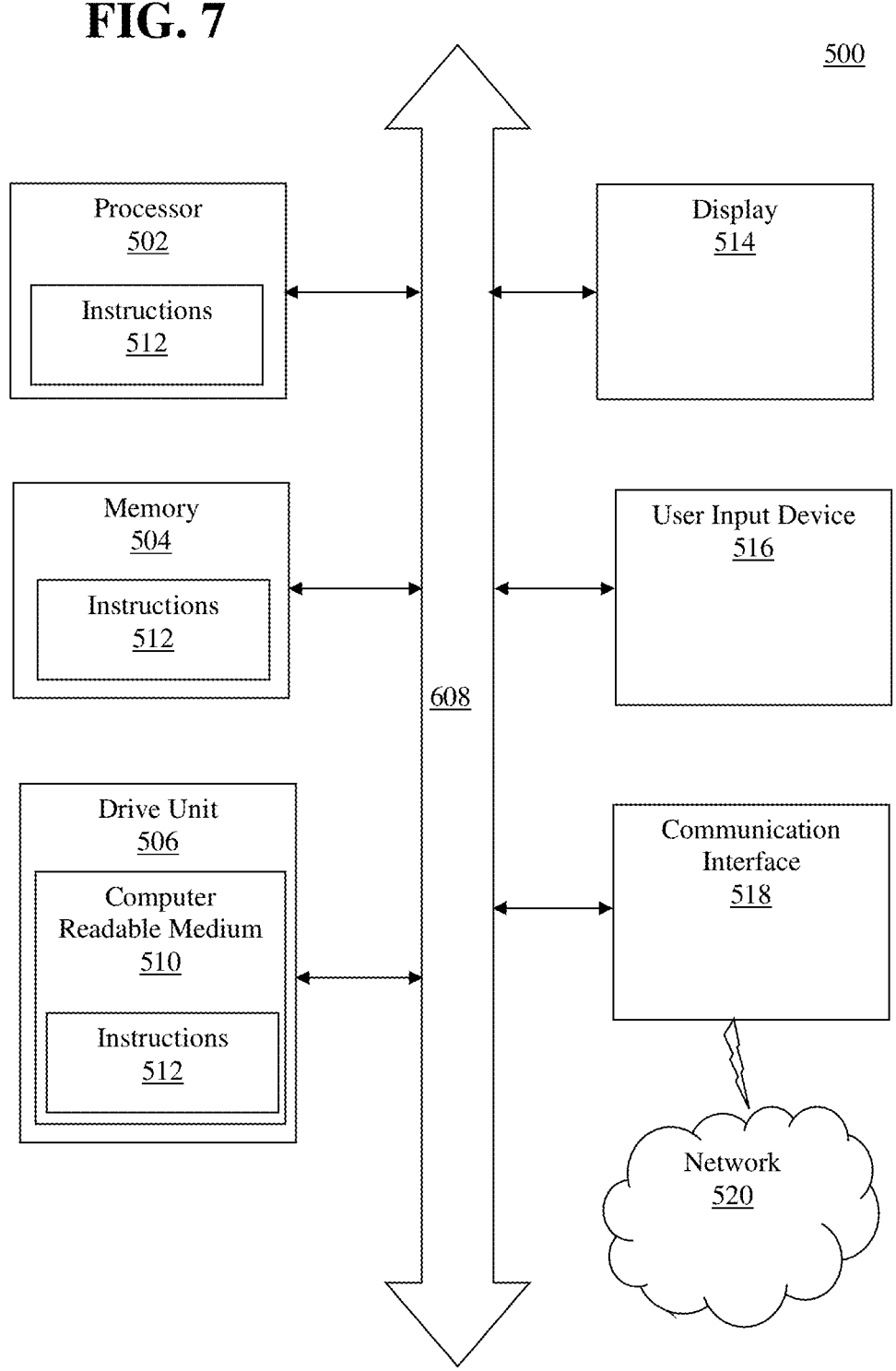
FIG. 7 depicts an exemplary computer system for use with the system of FIG. 2.

Referring to FIG. 7, an illustrative embodiment of a general computer system 600 is shown. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. Any of the components discussed above may be a computer system 500 or a component in the computer system 500.

In a networked deployment, the computer system 500 may operate in the capacity of a server or as a client user computer in a client-server user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 7, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 504 includes a cache or random access memory for the processor 502. In alternative embodiments, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display unit 514, such as a liquid crystal display (LCD), an organic light emitting diode (OLED), a flat panel display, a solid state display, a cathode ray tube (CRT), a projector, a printer or other now known or later developed display device for outputting determined information. The display 514 may act as an interface for the user to see the functioning of the processor 502, or specifically as an interface with the software stored in the memory 504 or in the drive unit 506.

Additionally, the computer system 500 may include an input device 516 configured to allow a user to interact with any of the components of system 500. The input device 516 may be a number pad, a keyboard, or a cursor control device, such as a mouse, or a joystick, touch screen display, remote control or any other device operative to interact with the system 500.

In a particular embodiment, as depicted in FIG. 7, the computer system 500 may also include a disk or optical drive unit 506. The disk drive unit 506 may include a computer-readable medium 510 in which one or more sets of instructions 512, e.g. software, can be embedded. Further, the instructions 512 may embody one or more of the methods or logic as described herein. In a particular embodiment, the instructions 512 may reside completely, or at least partially, within the memory 504 and/or within the processor 502 during execution by the computer system 500. The memory 504 and the processor 502 also may include computer-readable media as discussed above.

The present disclosure contemplates a computer-readable medium that includes instructions 512 or receives and executes instructions 512 responsive to a propagated signal, so that a device connected to a network 520 can communicate voice, video, audio, images or any other data over the network 520. Further, the instructions 512 may be transmitted or received over the network 520 via a communication port 518. The communication port 518 may be a part of the processor 502 or may be a separate component. The communication port 518 may be created in software or may be a physical connection in hardware. The communication port 518 is configured to connect with a network 520, external media, the display 514, or any other components in system 500, or combinations thereof. The connection with the network 520 may be a physical connection, such as a wired Ethernet connection or may be established wirelessly as discussed below. Likewise, the additional connections with other components of the system 500 may be physical connections or may be established wirelessly.

The network 520 may include wired networks, wireless networks, or combinations thereof, and may be representative of the networks 162 and/or 164. The wireless network may be a cellular telephone network, an 802.11, 802.16, 802.20, or WiMax network. Further, the network 520 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving, at a server, data indicative of a user input for content;
receiving, at the server, a location of a client device associated with the user input;
selecting, by the server, a task to be performed by the client device in exchange for access to the content, wherein the task is related to the location of the client device;
sending, from the server, the task to the client device; and
sending, from the server, the content to the client device, wherein completion of the task allows the client device to provide the content.

2. The method of claim 1, wherein the task includes machine incomprehensible instructions.

3. The method of claim 1, wherein the task includes instructions to manipulate one or more sensors of the client device.

4. The method of claim 3, wherein the one or more sensors include a positioning device or an accelerometer.

5. The method of claim 1, wherein the content includes geographic data and the task includes instructions to sketch on the geographic data.

6. The method of claim 1, wherein the task includes instructions to draw a line between two geographic features in the content.

7. The method of claim 1, wherein the task includes instructions to describe a geographic feature selected based on the location of the client device.

8. The method of claim 7, wherein the task includes a question to identify a building or a street at the location of the client device.

9. The method of claim 1, wherein the task requests a spoken response through the client device.

10. An apparatus comprising:
at least one processor; and
at least one memory including computer program code for one or more programs, the at least one memory and the computer program code configured to, with the at least one processor, cause the apparatus to at least:
receive a geographic location of a client device and data indicative of a user request for content from the client device;
select an instruction to be performed by the client device for access to the content, wherein the instruction is related to the geographic location of the client device;
sending the instruction to the client device; and
sending the content to the client device, wherein completion of the instruction allows the client device to provide the content.

11. The apparatus of claim 10, wherein the instruction includes a machine incomprehensible instruction.

12. The apparatus of claim 10, wherein the instruction includes an instruction to manipulate one or more sensors of the client device.

13. The apparatus of claim 12, wherein the one or more sensors include a positioning device or an accelerometer.

14. The apparatus of claim 10, wherein the content includes geographic data and the task includes instructions to sketch on the geographic data.

15. The apparatus of claim 10, wherein the instruction includes directions to draw a line between two geographic features in the content.

16. The apparatus of claim 10, wherein the instruction includes directions to describe a geographic feature selected based on the location of the client device.

17. A method comprising:
sending, from a client device, data indicative of a user input to request content to a content server;
sending, from the client device, a location of the client device associated with the user input to the content server;
receiving, at the client device, a task from the content server, wherein the task is a function of the location of the client device; and
presenting the task on the client device,
wherein the content is provided based on an attempted performance of the task on the client device being successful.

18. The method of claim 17, further comprising:
sending data indicative of the attempted performance of the task to the content server; and
receiving the content from the content server in response to the attempted performance being successful.

19. The method of claim 17, further comprising:
receiving a second user input as the attempted performance in response to the task;
determining whether the attempted performance is successful.

20. The method of claim 17, wherein the content includes geographic data and the task includes instructions to sketch on the geographic data.

* * * * *